United States Patent [19]

Nelson

[11] 3,921,532

[45] Nov. 25, 1975

[54] TRANSPORTATION SYSTEM AND VEHICLE THEREOF

[75] Inventor: Roy A. Nelson, Grand Prairie, Tex.

[73] Assignee: LTV Aerospace Corporation, Dallas, Tex.

[22] Filed: May 16, 1974

[21] Appl. No.: 470,417

[52] U.S. Cl............... 104/130; 104/242; 105/215 R
[51] Int. Cl.² ......................................... E01B 25/06
[58] Field of Search .............................. 105/215 R; 104/118–120, 130, 242–248

[56] References Cited

UNITED STATES PATENTS

| | | | |
|---|---|---|---|
| 3,180,280 | 4/1965 | Kuch | 104/245 |
| 3,338,182 | 8/1967 | Maestrelli | 104/247 |
| 3,589,302 | 6/1971 | Usami | 104/242 |
| 3,796,165 | 3/1974 | Goode | 104/247 |
| 3,812,789 | 5/1974 | Nelson | 104/130 |

Primary Examiner—Lloyd L. King
Assistant Examiner—D. W. Keen
Attorney, Agent, or Firm—Walter J. Jagmin; James M. Cate; H. C. Goldwire

[57] ABSTRACT

A transportation system having a roadway providing vehicle support surfaces and guide surfaces engageable by guide means of a vehicle movable over the support surfaces for controlling the movement of the vehicle over the roadway. A vehicle having a chassis frame supported by pairs of front and rear wheels turnable about vertical axes and a drive carriage connected to the chassis frame and having individual steering and guide means for each pair of vehicle wheels engageable with the roadway guide surfaces for turning the vehicle wheels to cause the vehicle to travel over the roadway in proper central position on the roadway.

17 Claims, 10 Drawing Figures

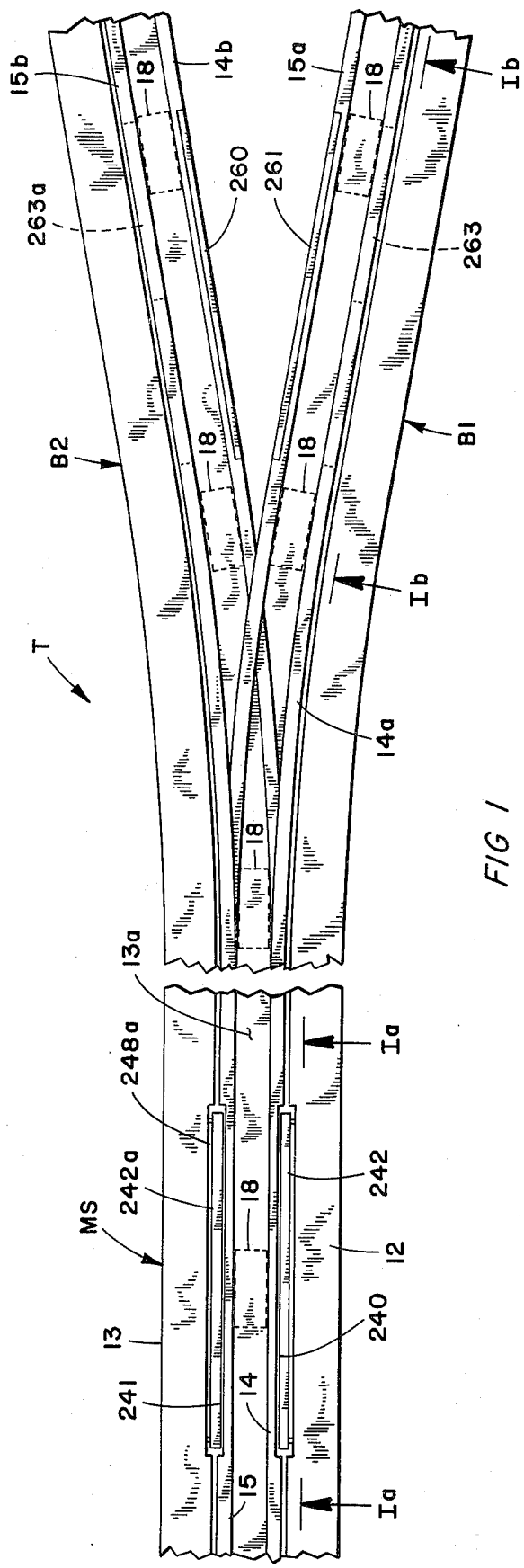
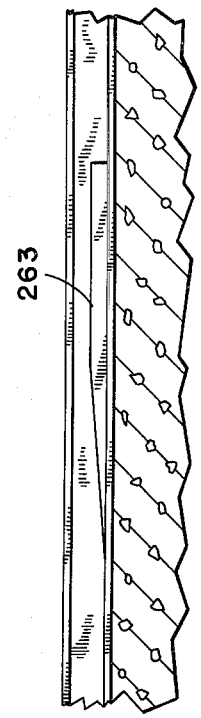
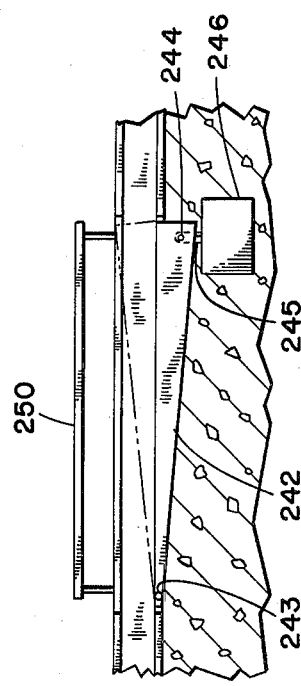
FIG 1
FIG 1b
FIG 1a

TRANSPORTATION SYSTEM AND VEHICLE THEREOF

This invention relates to transportation systems having roadways and to vehicles movable over the roadways.

As disclosed in the patent to Roy A. Nelson, U.S. Pat. No. 3,792,665 issued Feb. 19, 1974 and in the co-pending application of Roy A Nelson, Ser. No. 298,716 filed Oct. 13, 1972 and entitled TRANSPORTATION SYSTEM, now U.S. Pat. No. 3,812,789, transportation systems employing linear induction motors usually have a roadway in which a plurality of spaced primaries of the linear induction motor are embedded which are sequentially energized, and the secondaries of the linear induction are mounted on drive carriages of vehicles which push or pull the vehicles over the roadway. The carriages are supported on wheels which move over horizontal surfaces of the roadway and have relatively hard tires to resist the downward forces exerted on such vehicles by the magnetic forces between the primaries and secondaries.

The chassis frames of such vehicles are connected to such carriages by linkages which permit some vertical movement of the chassis frames relative to the carriages since the chassis frames are connected to the vehicle wheels by suspension means, such as coil springs, which permit some vertical movement of the chassis frame relative to the vehicle wheels and therefore to such carriages.

It is also found that some lateral movement of the vehicles relative to the roadway and to their drive carriages must be permitted for efficiency of propulsion of the vehicles and to minimize the shocks and vibration which would otherwise be imparted to the passengers or cargo being transported in such vehicles.

In addition, it is desirable that the drive carriages be provided with guide mechanisms cooperable with roadway guide rails which cause the drive carriages to follow the roadway and be properly centrally positioned thereon at all times and that the support wheels of the vehicle be connected to the drive carriages by steering mechanisms which cause the vehicle support wheels to be steered responsive to the turning movements of the drive carriages as they move over curved portions of roadway and with restraining means cooperable with the steering mechanisms for limiting lateral displacements of the vehicles relative to their drive carriages and the roadway which tend to take place if the roadway is slippery due to moisture or ice and if lateral forces, such as those caused by wind, are exerted on the vehicles.

It is also desirable that the roadway does not have any upstanding guide rails such as those disclosed in the above identified co-pending application, both for economy of manufacture or construction of the roadway and to facilitate movement of conventional vehicles transversely over such roadways.

Accordingly, it is an object of this invention to provide a new and improved transportation system having a roadway and vehicles which are movable thereover wherein the roadway and the vehicles are provided with co-engageable steering and guide means for causing the vehicle to travel over and follow the roadway and for limiting lateral displacements of the vehicles relative to the roadway due to side loads, such as those imposed on the vehicles by winds.

Another object is to provide a transportation system having a roadway providing a pair of horizontal longitudinally extending outer support surfaces over which the vehicle support wheels are movable and a pair of vertical parallel guide surfaces extending downwardly of such support surfaces and engageable by suitable guide means of the vehicles for steering a vehicle moving along the roadway and limiting its lateral displacement relative thereto.

Still another object is to provide a transportation system, of the type described, wherein the guide surfaces are provided by guide beams having top flanges extending inwardly therefrom on which may roll the support wheels of the drive carriages of the vehicle, on which the secondaries of an electric linear induction motor are mounted, the primaries thereof being embedded in the roadway between the guide beams and rigidly attached to the guide beams.

A further object is to provide a transportation system wherein the primaries of the linear induction motor are embedded in the roadway between the guide beams and each vehicle is provided with a drive carriage on which the secondaries of an electric motor are mounted, such carriages being connected to the chassis frame of the vehicles by the linkages which prevent longitudinal movement of the carriages relative to the chassis frames but which permit some lateral and vertical movement of the chassis frames relative to the drive carriages.

An important object of the invention is to provide a vehicle having a chassis frame having individually steerable pairs of front and rear vehicle support wheels and a carriage disposed below the chassis frame and extending longitudinally between the right and left wheels of the vehicle support wheels, wherein the carriage is supported during movement over the roadway by support wheels which are turnable about vertical axes by a guide means of the carriage engageable with vertical guide surfaces of the roadway which cause the carriage to follow the roadway.

Another object is to provide a vehicle, of the type described, wherein each pair of front and rear wheels of the vehicle is provided with a steering mechanism connected between the vehicle support wheels and the carriage which causes steering turning movement of the vehicle support wheels in accordance with the turning movement of the carriage as it moves over curved portions of the roadway to cause the vehicle to turn therewith and follow the roadway and which limits lateral displacement of the vehicle support wheels and chassis relative to the roadway and to the carriage.

Still another object is to provide a vehicle, of the type described, wherein the steering and guide mechanism permits the vehicle support wheels and the chassis frame to move laterally relative to the carriage to accommodate small lateral displacements of the chassis frame relative to the carriage and which stops such lateral displacements thereof if they exceed a pre-determined value.

Other objects and advantages will be apparant from the specification and claims and from the accompanying drawings illustrative of the invention.

In the drawings:

FIG. 1 is a fragmentary top view of a roadway, with some parts removed, of a transportation system embodying the invention;

FIGS. 1a and 1b are sectional views taken as lines 1a—1a and 1b—1b of FIG. 1;

Figure 2:
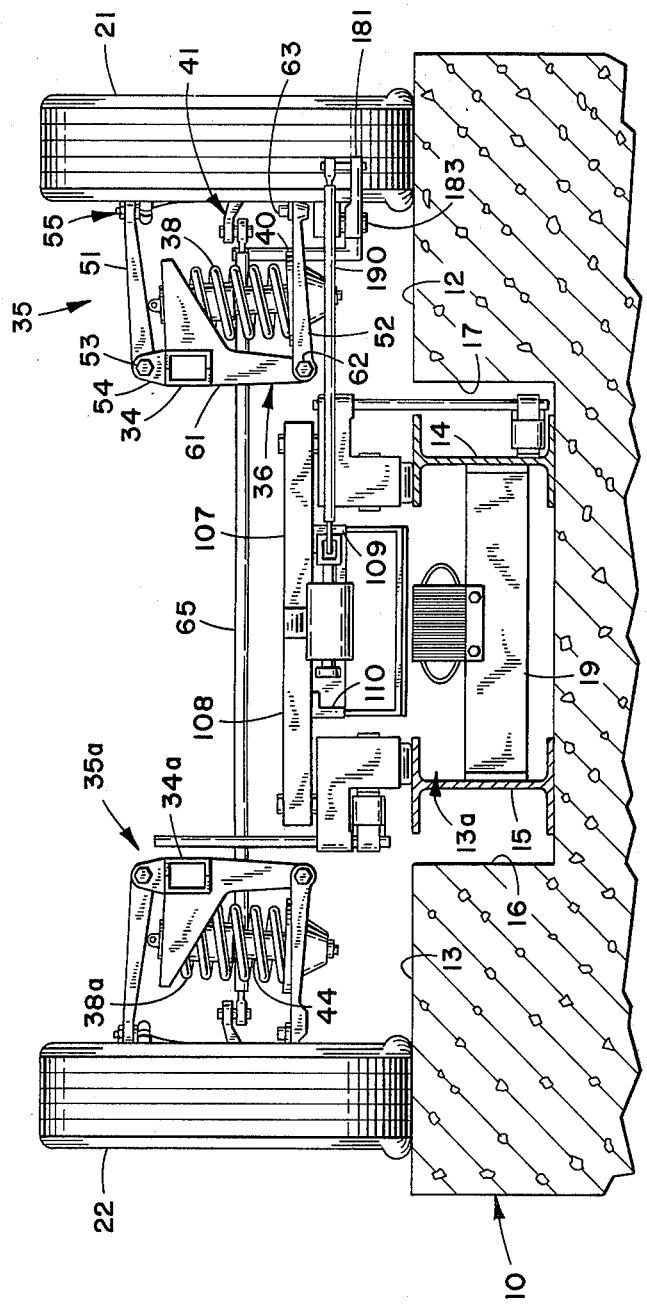
FIG. 2 is a vertical sectional view, with some parts removed and showing the front end of a vehicle of the transportation system on the roadway.

Referring now to the drawings, the transport system T includes a roadway R which may have a main section MS and branch sections B1 and B2. Each of the sections, FIG. 2, is formed of an elongate concrete body or slab 10 having top support surfaces 12 and 13, on which the wheels of the vehicles V are supported and along which they roll. Each roadway section also has a central island 13a defined by a pair of parallel I-beams 14 and 15 which are spaced inwardly of the vertical surfaces 16 and 17 of the roadway slab 10.

A plurality of spaced primaries 18 of a linear induction motor are positioned on a support 19 extending between the I-beams 14 and 15 and secured thereto. The top surfaces of the I-beams 14 and 15 lie in the same plane as the support surfaces 12 and 13 for a reason to be discussed below.

Figure 3:
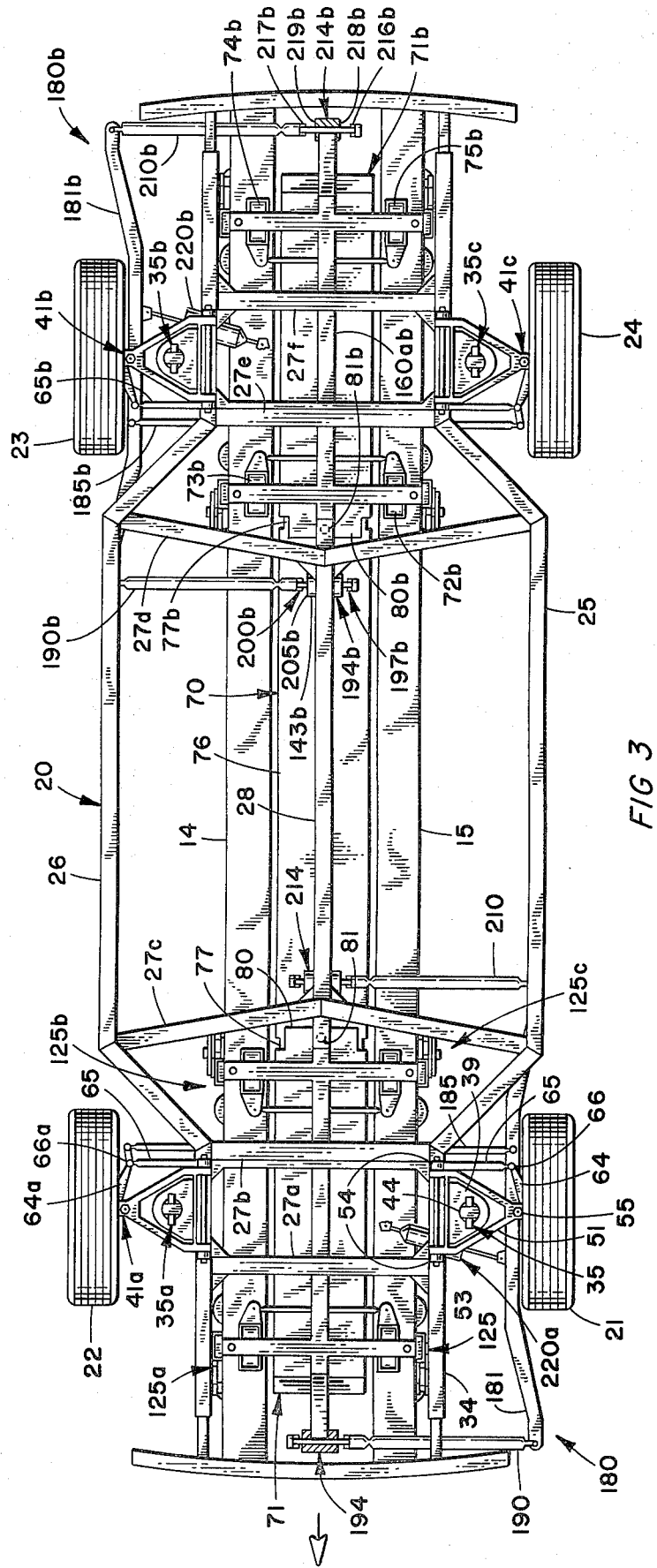
FIG. 3 is a top view of the chassis and carriage of a vehicle of the transportation system.
Figure 4:
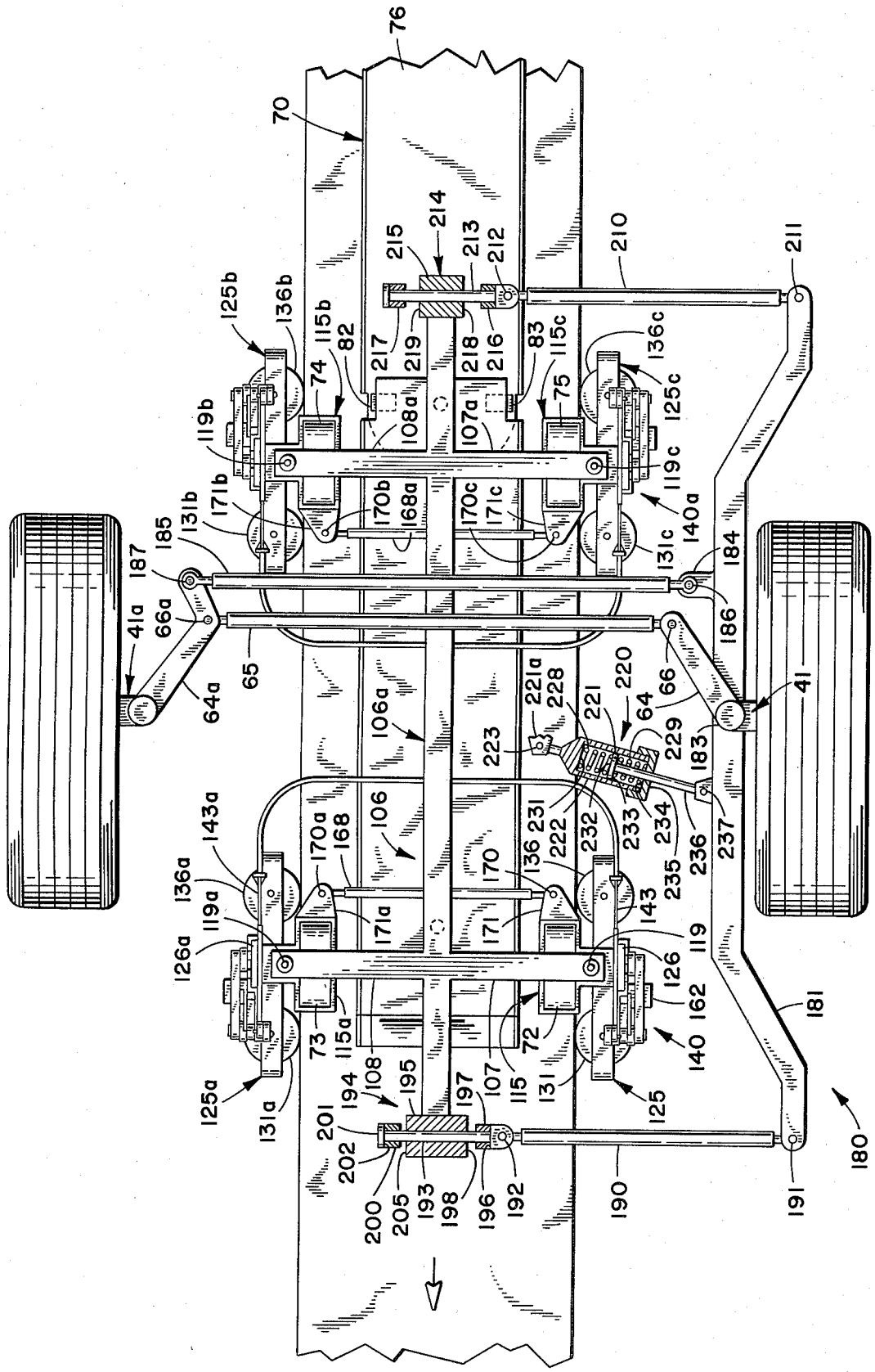
FIG. 4 is a top view, with some parts removed, of the front portion of the carriage of the vehicle.
Figure 5:
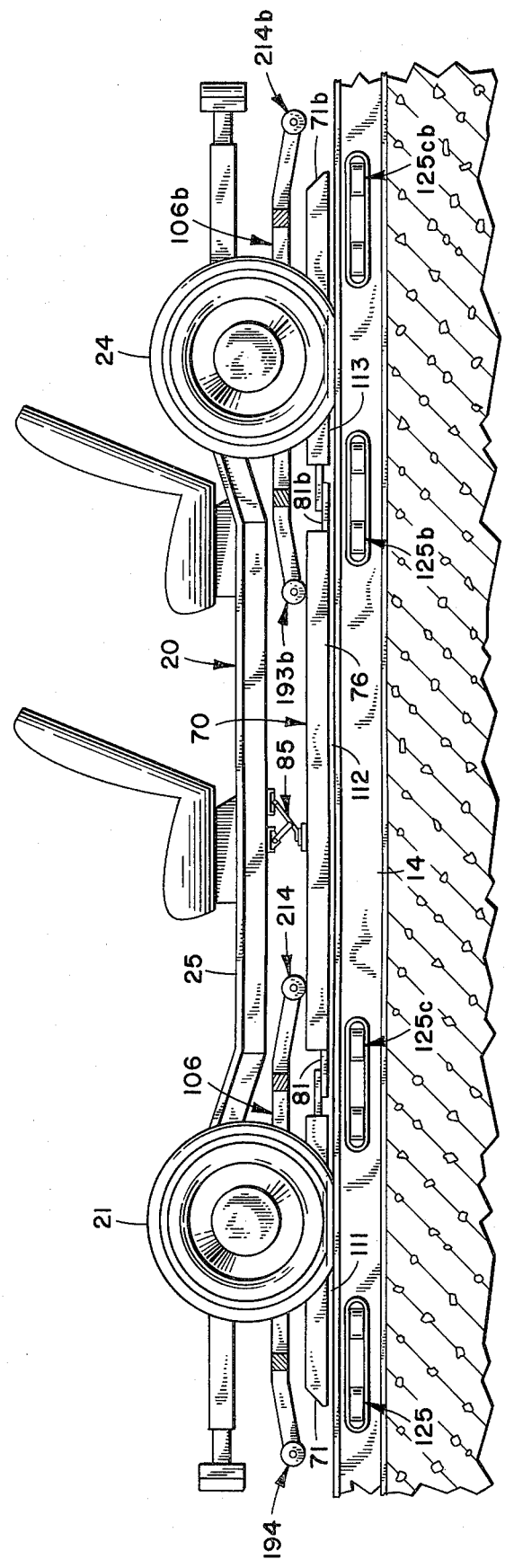
FIG. 5 is a side view, with some parts removed, of a vehicle of the transportation system.
Figure 6:
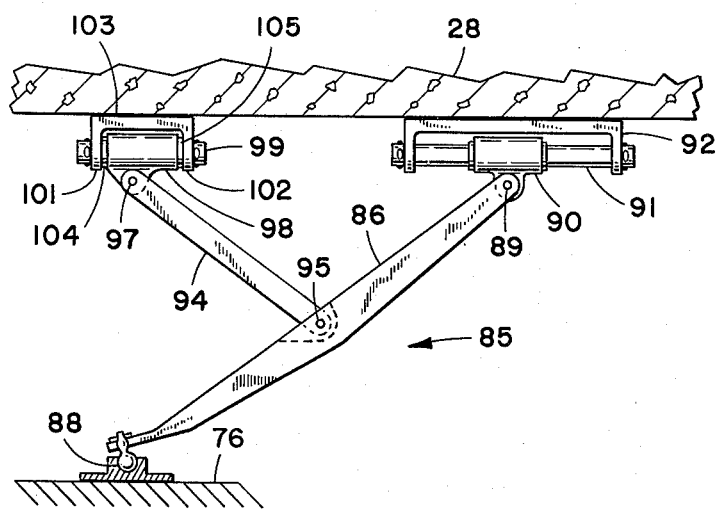
FIG. 6 is a side view of a linkage of the vehicle.
Figure 7:
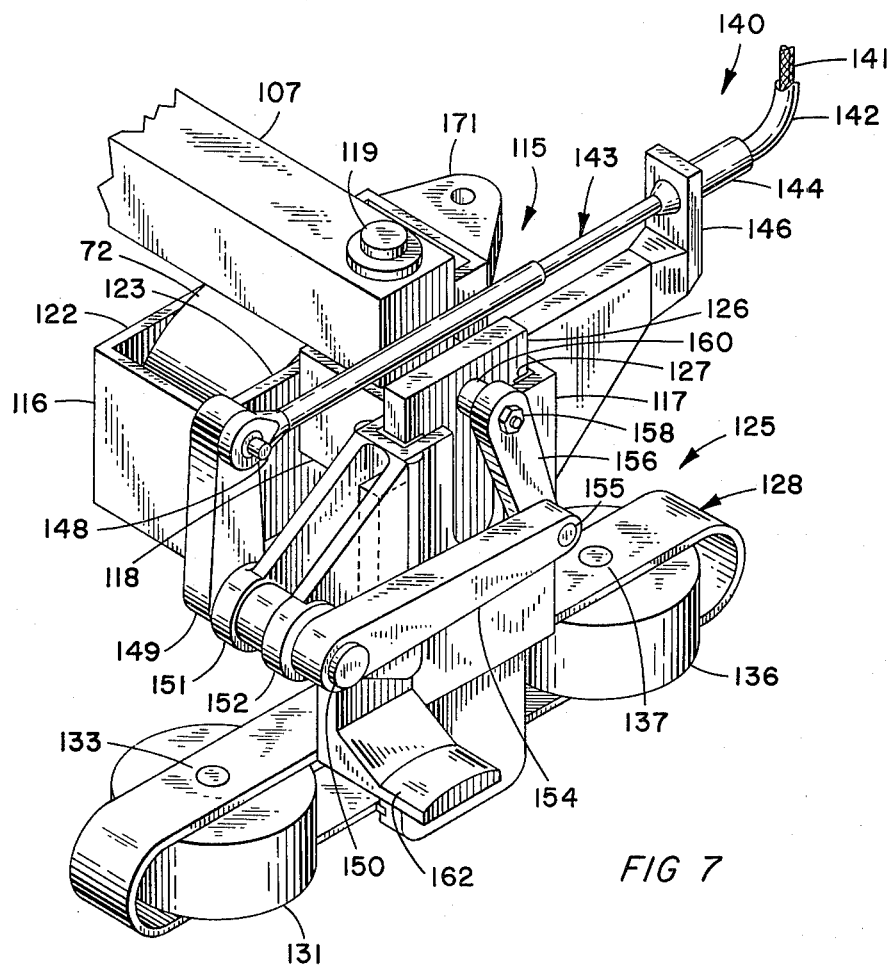
FIG. 7 is a perspective view of one of the carriage wheels and its support and guide means.
Figure 8:
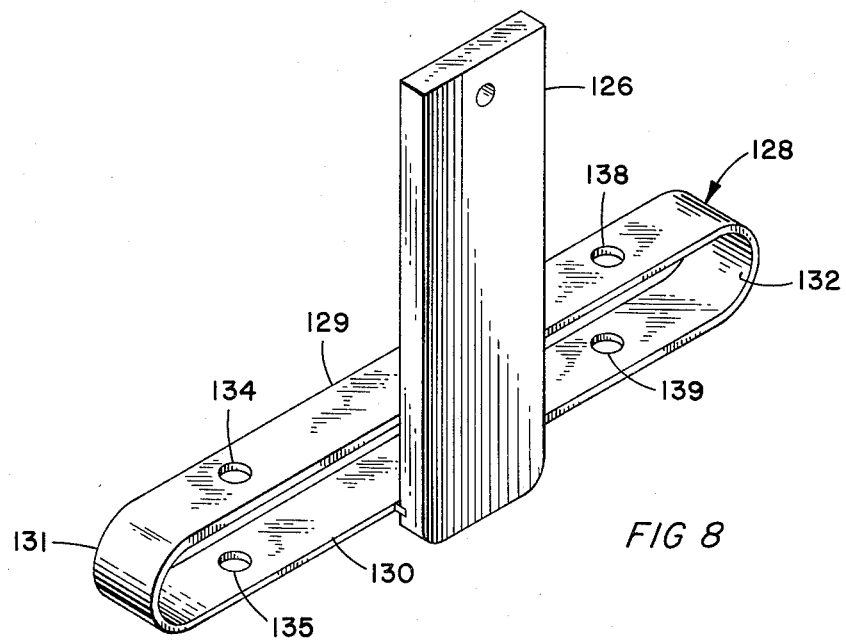
FIG. 8 is a perspective view of guide wheel bracket of the vehicle.

Referring now particularly to FIGS. 2, 3, and 4 of the drawings, each of the vehicles V adapted to travel over the roadway R includes a chassis frame 20 supported by a pair of front wheels 21 and 22 and a pair of rear wheels 23 and 24.

The chassis frame includes left and right side beams or members 25 and 26, respectively, which are connected by a plurality of transverse members 27a–27f and a central member 28 which extends between the transverse members 27c–27d.

The left front section 34 of the left frame member 25 is connected to the left front wheel 21 by a conventional suspension assembly 35 which permits some vertical movement of the front section 34 relative to the wheel while permitting pivotal turning movement of the wheel about a substantially vertical axis.

The suspension assembly 35, FIG. 2, includes a bracket 36 rigidly secured to the front left frame member front section 34 which is biased upwardly relative to the wheel 21 by a coil spring 38 whose top end bears against the top horizontal plate or portion 39 of the bracket 36 and whose bottom end bears against a plate 40 rigid with an A-frame 52. The axle for the front wheel 21 extends outwardly from the axle bracket and the wheel is rotatably mounted on the axle by any well known means.

The spring is damped by a shock absorber 44 whose opposite ends extend through suitable apertures in the plates 39 and 40.

The vertical movement of the left frame member front section 34 is guided by a pair of top and bottom A-frame links 51 and 52. The top link is connected at its inner end to the frame section 34 by a shaft or bolt 53 which connects the top link to a pair of upstanding lugs 54 of the front section 34 and which permits only pivotal movement about a horizontal axis of the top link relative to the frame section 34. The outer end of the top link is connected to the axle bracket 41 by a ball and socket joint 55 which permits not only horizontal pivotal movement of the outer end of the top link relative to the axle bracket, but also turning movement of the axle bracket about a vertical axis Y—Y relative to the outer end of the top link.

The bottom link 52 is identical to the top link and is pivotally connected at its inner end to the depending legs 61 of the bracket 36 by a bolt 62 and is connected to the axle bracket 41 by a ball and socket joint 63.

The axle bracket 41 has a steering arm 64, FIGS. 3 and 4, rigid therewith which extends inwardly and rearwardly therefrom.

The axle brackets 41a, 41b and 41c and the suspension assemblies 35a, 35b, and 35c by which the wheels 22, 23 and 24 are connected to the chassis frame member sections 34a, 34b and 34c being identical to the suspension assembly 35 and the axle bracket 41, their elements have been provided with the same reference numerals, to which the subscripts "a", "b", and "c", respectively, have been added, as the corresponding elements of the axle bracket 41 and the suspension assembly 35.

The steering arm 64 of the axle bracket 41 FIG. 4, of the left front wheel is connected to the steering arm 64a of the right front wheel 22 by a tie rod 65 pivotally connected to the steering arms 64 and 64a, as at 66 and 66a, respectively, so that the two wheels will turn simultaneously about vertical axes whenever turning movement is imparted to the steering arm 64a as will be explained below.

A drive carriage 70 is disposed beneath the chassis frame and extends longitudinally between the right and left vehicle wheels. The carriage includes a front section 71 which is supported on the top inner flanges of the beams 14 and 15 by support wheels 72, 73, 74 and 75; a rear section 71b which is similarly supported for travel over the inner flanges of the beams by support wheels 72b–75b, and a center section 76 which extends between and is pivotally secured to and supported by the front and rear sections 71 and 71b. The center section has end portions 77 and 77b which underlie the end portions 80 and 80b of the front and rear sections and are connected thereto, as at 81 and 81b, by suitable means, such as ball and socket joints or trunnions which permit pivotal movement of the end sections about vertical and transverse axes relative to the center section. Bearing pods 82 and 83 prevent relative rotation about the longitudinal axis.

The center section 76 of the carriage is connected to the central chassis frame member 28 by a thrust linkage 85 which permits lateral and vertical, but not longitudinal, movement of the chassis relative to the carriage. The thrust linkage includes a link 86 whose bottom end is connected to the carriage central portion 76 by a ball and socket joint or connection 88, and whose top end is pivotally connected as at 89, to a sleeve 90 which is rotatable and slideable on a shaft 91 mounted on a U-shaped bracket 92 rigidly secured to the chassis frame member 28. A second link 94 of the thrust assembly has its lower end pivotally connected, as at 95, to the first link 86 at a location intermediate the ends of the first link and the upper end of the second link is pivotally secured, as at 97, to a sleeve 98 which is rotatably mounted on a shaft 99 journaled in the dependent legs 101 and 102 of a bracket 103 rigidly secured to the chassis frame central member 28. The sleeve 98, while it is rotatable about the longitudinal axis, is not slideable thereon since suitable bushings 104 and 105 are interposed between the ends of the sleeve and the arms 101 and 102, respectively, of the bracket.

The carriage front end section includes a support frame 106 having a central longitudinal portion 106a, a pair of front transverse arms 107 and 108, and a pair of rear arms 107a and 108a extending laterally outwardly of the central portion. The front section 71 of the carriage is connected by suitable brackets 109 and 110 to the arms 107 and 108, FIG. 2, and the rear section is similarly connected to the rear arms 107a and 108a by similar brackets.

The secondaries 111, 112 and 113 of the linear induction motor are rigidly secured to the lower surfaces of the front, central and rear sections of the carriage by any suitable means and cooperate with the primaries 18 thereof, when the latter suitably energized, to impart a longitudinal driving force to the carriage and therefore to the vehicle to cause the vehicle to move over the roadway. The exact manner of operation of the linear motor is well known to those skilled in the art and disclosed and descrived in the above identified application and patent of Roy A. Nelson.

The left front support wheel 72 of the front carriage section 71 is mounted for rotation about a horizontal axis in a wheel support 115 having a substantially rectangular wheel housing portion 116, in which the support wheel 72 is disposed, and an outer portion 117 which is connected to the wheel housing portion 116 by a connector portion 118. The wheel support is secured to the front left transverse arm 107 of the carriage frame by a vertical shaft 119 which extends through suitably aligned apertures in the arm 107 and the connector portion 118 of the wheel support.

The support wheel is rotatably mounted on a shaft whose opposite ends are journaled in opposite side walls 122 and 123 of the wheel housing portion 116.

A guide wheel assembly 125 is mounted for limited vertical movement on the outer portion 117 of the wheel suppport 115 and includes a vertical slide bar 126 which extends through a vertical rectangular passage 127 of the outer portion 117, and an elongate bracket 128 having upper and lower horizontal portions 129 and 130 connected at their opposite ends by bight portions 131 and 132. The slide bar is welded to the inner edges of the horizontal portions 129 and 130.

A front guide wheel 131 is rotatably mounted between the horizontal portions 129 and 130 for rotation about a front vertical axis forwardly of the slide bar 126 by a shaft 133 parallel in the front apertures 134 and 135 of the horizontal portions and a rear guide wheel 136 is similarly mounted between the horizontal portions rearwardly of the slide bar 126 by a shaft 137 which is journaled in the aligned apertures 138 and 139 of the horizontal portions.

The slide bar 126 of the wheel support 115 of the left front wheel support 115 is connected to the slide bar 126a of the right wheel support 128a by a linkage 140 which includes a flexible member or cable 141 which extends through a flexible sheath 142, its left end being connected to a rod 143 which is slideably supported by a connector fitting 144 mounted on a bracket 146 of the wheel support 115. The sheath 142 is also connected to the fitting 144.

The rod 143 is pivotally connected by a link 148 to an arm 149 rigid with a shaft 150 journaled in the outer ends of a pair of forwardly extending arms 151 and 152 of the wheel support 115 which extend from the outer portion 117 of the wheel support. The shaft 150 is caused to turn in a clockwise direction when the slide bar 126 moves in a downward direction relative to the wheel support by an arm 154, one of whose ends is rigidly secured to the shaft 150 and whose other end is pivotally secured, as by a bolt or shaft 155, to a link 156 whose upper end is pivotally secured to the slide bar 126 by a bolt 158. A suitable spacer sleeve 160 is interposed between the slide bar and the link 156.

A stop 162 is rigidly secured to the outer portion 117 of the wheel support 115 and extends laterally outwardly therefrom for a purpose to be described below.

The carriage wheels 73, 74 and 75 of the front carriages are connected to the outer ends of the carriage support frame arms 108, 107a and 108a by support assemblies 115a, 115b, and 115c which are identical to the wheel support 115 and, accordingly, their elements have been provided with the same reference numerals, to which the subscripts "a", "b", and "c", respectively, have been added, as the corresponding elements of the wheel assembly 115.

The wheel supports 115 and 115a of the front wheels 72 and 73 are connected by a link rod 168 whose opposite ends are pivotally connected, as at 170 and 170a, to the rearwardly extending arms 171 and 171a of the wheel supports 115 and 115a so that the carriage wheels 72 and 73 will turn simultaneously. The wheel supports 115b and 115c of the rear front carriage section wheels 73 and 74 are similarly connected by a link rod 168a which is pivotally connected, as at 170b and 170c, to the arms 171b and 171c.

The guide wheels of the four carriage support wheels 72, 73 74 and 75 are adapted to engage the vertical webs of the guide beams 14 and 15 so that the pair of front carriage support wheels 72 and 73 and the pair of rear carriage support wheels 74 and 75 will be turned at the locations of curves in the roadway to cause the carriage to follow the roadway and so that lateral displacement of the carriage relative to the roadway is prevented.

The front vehicle wheels 21 and 22 of the vehicle are caused to turn to travel over curved portions of the track and to hold the vehicle centered on the roadway during travel over straight portions of the roadway by a steering mechanism 180 which includes a steering lever 181 whose front and rear ends are connected to front and rear ends of the drive carriage support frame 106.

The steering mechanism 180 includes the elongate steering lever 181 which is pivotally secured to the axle bracket 41 of the left front vehicle wheel 21, as at 183. The steering lever has an inwardly projecting lug 184 which is connected to the steering arm 64a of the right front wheel 22 by a link rod 185 whose opposite ends are pivotally secured as at 186 and 187, respectively, to the steering arms 64 and 64a, respectively.

The front end of the steering lever 181 is connected to the front end of the carriage frame central member 106a by a steering rod 190, one of whose ends is pivotally secured at 191, to the front end of the steering arm 181 and whose other end is pivotally secured, as at 192, to the outer end of a slide rod 193 of a lost motion coupling 194. The connection, 191 or 192, are ball joints to permit some vertical movement of the steering lever relative to the carriage due to changes in load and the degree of inflation of the vehicle support wheel tires. The slide rod extends slideably through a suitable slide housing 195 of the coupling rigidly secured, as by welding, to the front end of the carriage frame member 106a. The slide rod 193 has an enlarged head portion which provides an annular shoulder 196 which limits the movement of a resilient shock absorber or sleeve 197 telescoped on the slide rod. The other end of the shock absorber 197 is adapted to engage the annular end surface 198 of the slide housing 195.

A similar shock absorber 200 is telescoped on the other end of the slide rod 193 and is held against outward displacement thereon by a screw 201 which is threaded in a suitable bore of the slide rod and which provides an annular stop shoulder 202 which limits outward movement of the shock absorber 200 on the slide rod. The inner end of the shock absorber 200 is adapted to engage the other end surface or shoulder 205 of the slide housing.

The rear end of the steering arm 181 is connected to the rear end of the central portion 106a of the carriage frame by a restraint rod 210, whose outer end is pivotally connected to the rear end of the steering lever 181, as at 211, and whose inner end is pivotally connected, as at 212, to a slide rod 213 of a lost motion coupling 214. The slide rod 213 extends slideably through a slide housing 215 of the lost motion coupling 214 rigidly secured to the rear end of the central portion 106a of the carriage frame.

Resilient sleeves or shock absorbers 216 and 217 are disposed on the slide rod to engage the shoulders 218 and 219 of the slide housing. The slide housing 215 is of shorter length than the slide housing 195. Initial short lateral movement of the front end of the carriage support frame relative to the chassis frame, i.e., ¼ inch in either direction, will cause one end or the other of the slide housing 195 to engage the shock absorber 197 or 200 to cause pivotal movement of the steering arm 181. Much greater movement of the rear end of the carriage support frame, and therefore of the slide rod 213 relative the slide housing 214, for example, 2 inches in either direction, is required before either end surface 218 or 219 of the slide housing 215 engages the shock absorber 216 or 217.

The rear carriage section 71b and the steering mechanism 181b which controls movement of the rear vehicle support wheels 23 and 24 are identical to the front carriage section and the steering mechanisms 181 of the rear wheels, and accordingly, elements of the rear carriage section and the steering mechanism 181b have been provided with the same reference characters, to which the subscript "b" has been added, as the corresponding elements of the front carriage section 71 and of the steering mechanism 181.

The lost motion coupling 194b permits limited free movement of the front end of the central longitudinal member 106ab of the carriage frame of the rear carriage section 71b relative to the steering rod 190b, for example, 2 inches, in either direction before such motion causes pivotal movement of the steering 181b of the steering mechanism 180b. The coupling also permits lateral movement of the rear end of the rear carriage section frame, for example, 3 inches, in either direction from a centrally aligned position relative to the rear wheels before the restraint rod 210b prevents further lateral movement of the rear wheels.

A biasing mechanism 220 is connected between the steering arm 181 and a dependent leg 221a of the chassis frame and includes a piston 221 slideable in a cylinder 222 whose inner end is secured, as at 223, by a ball and socket joint or connection to the dependent leg 221a of the vehicle chassis frame.

The piston is biased towards a central position by a pair of compression springs 228 and 229. The spring 228 has its opposite ends engaged with the stop shoulder 231 of the cylinder and the stop surface 232 of the piston while the spring 229 has its opposite ends engaged with the annular shoulder 233 of the piston and the annular shoulder 234 of a cap 235 screwed on the end of the cylinder 222. The piston rod 236, of course, extends outwardly from the piston through an appropriate passage in the cap and is pivotally connected, as at 237, to the steering arm 181.

During movement of the vehicle over a straight portion of the roadway, the biasing mechanisms 220 and 220b will tend to hold the vehicle wheels 21, 22, 23 and 24 against turning movement so that the vehicle will tend to move in a straight line. The guide wheels of the front and rear carriage sections will then move in a straight line since they engage the opposite sides of the guide beams 14 and 15. Minor deviations from a straight plane of the vertical outer surfaces of the guide beams engaged by the guide wheels will cause some turning movement of the carriage support wheels, but will not cause any turning movement of the vehicle wheels since the front lost motion coupling 194 permits some lateral movement of the front end of the frame 106, for example, about a quarter inch in either direction before the steering rod 190 is moved. Similarly, the lost motion coupling 194b permits some lateral movement, e.g., about two inches in either direction of the rear end of the rear carriage section support frame 106b relative to the steering rod 190b before lateral movement is imparted to the steering rod 190b.

In use, the drive carriage always moves in centrally aligned relation over the roadway since the guide wheels of the drive carriage bear against the webs of the guide beams 14 and 15. The chassis frame and the wheels 21, 22, 23 and 24 of the vehicle may move laterally relative to the drive carriage and the roadway to a limited degree since the thrust linkage 85 permits such lateral movement as well as vertical movement of the chassis frame relative to the carriage.

Assuming now that the vehicle is moving over a straight portion of the roadway, if lateral loads, such as wind loads, are exerted on the vehicle and if the traction between the vehicle support wheels and the roadway surfaces 12 and 13 is low due to moisture, ice or snow being present on the roadway, the chassis frame will of course tend to move laterally relative to the roadway and the carriage. For example, if the lateral loads tend to move the vehicle to the left, the chassis frame will tend to move to the left relative to the carriage since the carriage is held against lateral movement by the guide wheels. Such motion of the vehicle chassis frame relative to the drive carriage will cause the shock absorber 200 of the front lost motion coupling 193 of the front end section of the carriage to engage the stop shoulder 205 of the slide housing 194 after the slide rod has moved about one quarter of an inch to the left and will cause the steering rod 190 to pivot the steering lever 181 in a clockwise direction about the axis of its pivotal connection to the axle bracket 41.

This clockwise pivotal movement of the steering lever 181 will in turn cause the front vehicle wheels 21 and 22 to turn in a clockwise direction about their turning axes thus tending to steer the front end of the vehicle to the right relative to the roadway and the carriage and therefore back towards its central position relative to the roadway and the carriage. If this steering movement of the front wheels 21 and 22 is not effective to stop the lateral displacement of the chassis frame to the left so that such lateral displacement of the front end of the chassis frame exceeds about 1 inch, the shock absorber 217 of the rear lost motion coupling 214 will engage the stop shoulder 219 of the housing 214. As a result, after a given turning movement of the front wheels, for example, of 2°, about their vertical axes, pivotal movement of the steering lever 181 will be arrested and lateral movement of the chassis frame relative to the carriage, and therefore to the roadway, will be arrested.

It will be apparent that the shock absorbers 200 and 217 will yield to some extent and will serve to absorb shocks and vibrations. The vehicle will then proceed to move with the front wheels being turned at the slip angle of approximately 2°. The rear wheels will tend to follow the front wheels and will not be steered unless the lateral displacement of the rear end of the chassis frame relative to the carriage is so great, about 2 inches, as to cause the bumper 200b to engage the stop shoulder 205b of the housing 195b. Further, lateral displacement of the rear end of the chassis frame will now cause the rear wheels to be turned about their vertical axes in a clockwise direction, thus tending to move the rear end of the vehicle back towards its central longitudinal position relative to the carriage and the roadway. If such lateral movement of the rear end of the chassis frame exceeds about 2½ inches, the shock absorber 217b of the rear lost motion coupling 214b will engage the shoulder 219b of its housing 215b, the rear wheels will be locked against further turning movement and the rear end of the chassis frame against further lateral movement to the left. Since the difference in the degree of lost motion provided by the lost motion coupling 214b and 194b is less, for example, 1 inch, than the difference in the degree of lost motion of the lost motion couplings 194 and 214, the rear wheels will be locked against further turning movement when they have been turned a smaller angle, e.g., one degree, in a clockwise direction about their vertical axes.

Both the front and rear vehicle wheels are now turned for movement toward the right so that once the side load is removed or the vehicle moves onto a portion of the roadway providing better traction, both the front and rear ends of the vehicle will tend to move back to central positions on the roadway.

It will, of course, be apparent that the vehicle wheels will be turned in an opposite direction if the wind loads are such as to tend to move the vehicle to the right and the lateral displacement of the vehicle chassis relative to the carriage and the roadway will be arrested in similar manner when the lateral movements of the restraint rods 210 and 210b are arrested.

Assuming now that the vehicle is traveling over a straight portion MS of the roadway and assuming that no lateral forces are being exerted on the vehicle, the steering mechanisms 180 and 180b are in the positions illustrated in FIGS. 3 and 4. The biasing or detent mechanisms 220 and 220b are now effective to hold the steering levers 181 and 181b in their normal positions and the front and rear wheels are rolling forwardly in straight paths.

As the vehicle approaches a portion of the roadway which curves, the guide wheels 131a and 136a or the guide wheels 131 and 136 will cause the wheel support 115a or 115 of the carriage support wheel 73 to turn about the axis of the shaft 119a or 119. Such pivotal movement of a wheel mount 115a or 115 will, of course, cause similar simultaneous pivotal movement of the other wheel support 115 or 115a. Such turning movement of the wheels 72 and 73 will, of course, result in turning movement of the front end of the carriage frame 106a of the carriage front end section 70 causing the housing 195 of the front lost motion connection 193 to engage its shock absorber 197 or 200 thus causing pivotal movement of the steering lever 181 against the resistance being offered by the spring 228 or 229 of the biasing mechanism. The front wheels of the vehicle will therefore then also turn to follow the roadway as it curves in one direction or the other. The lost motion coupling 214 will not interfere with such pivotal movement of the steering lever since the rear end of the carriage front end section frame 106a will move in the same lateral direction as the rear end of the steering lever.

The rear wheels 73 and 74 of the carriage will similarly be turned about the axes of their shafts 119b and 119c as they move along a curved portion of the roadway. If the curve is of relatively large radius, the lateral movement of the rear end of the carriage rear end section frame 106ab will not be so great as to cause the slide housing 195b to engage the shock absorber 200b or 197b. The biasing mechanism 220b will therefore hold the rear wheels 23 and 24 straight.

If the radius of curvature of the roadway is relatively small so that the front end of the carriage rear end section frame 106ab moves laterally relative to the front end of the steering lever 181b a distance great enough to cause the housing 195b to engage either the shock absorber 200b or the shock absorber 197b, the rear vehicle support wheels will be turned in the appropriate direction.

As the vehicle moves off a curved portion of the roadway and onto a straight portion, the guide wheels of the carriage front end section and then the carriage rear end section will turn, pivoting the steering levers 181 and 181b in proper directions to turn the vehicle wheels to positions for travel in a straight direction. The biasing mechanisms 220 and 220b will then again be operative to tend to hold the vehicle moving in a straight path.

During movement of a vehicle over a curved portion of the roadway of relatively great radius of curvature, the rear wheels merely track the front wheels since the lost motion connection 193b permits a relatively great movement, for example, 2 inches, of the front end of the carriage rear end section support frame 106ab relative to the steering rod 190b. If the curved portion of the roadway is of relatively small radius, the movement of the front end of the carriage rear end section support frame relative to the front end of the lever 181b will be greater than the lost motion provided by the lost motion coupling 194b so that the rear wheels will also be turned about their axes of turning after the front end of the carriage rear end section support frame 106ab has moved a distance greater than 2 inches relative to the front end of the steering lever 181b.

During the periods the steering mechanisms are operative as the vehicle moves over curved portions of the roadway, the shock absorbers of the lost motion coupling absorb shock and vibration forces induced in the carriage.

The guide wheels of each carriage support wheel are mounted for vertical movement relative to its wheel support 115 to permit switching of the vehicle from one section of the roadway, such as the main section MS to another section, such as the branch section B1 or B2.

The branch section B1 of the roadway has a central island 13a, defined by the I-beams 14a and 15a, the guide beam 14a being a continuation of the guide beam 14 while the guide beam 15a extends from the end of the guide beam 15. Similarly, the branch section B2 has a central island 13b defined by the guide beams 14b and 15b, the guide beam 15b being a continuation of the guide beam 15, while the guide beam 14b extends from the location of the end of the guide beam 14 of the main section. The guide beam 14b has two sections, one section extending between the guide beam 14 and the guide beam 15a and the other extending out from the guide beam 15a.

The top surfaces of the guide beams lie in a common horizontal plane and provide smooth rolling surfaces for the carriage support wheels so that a minimum of noise and vibration is generated due to the rolling movement of the carriage wheels over the guide beams.

It will be apparent that if the vehicle moving on the main section MS is to turn to the right onto the roadway branch section B1, the guide wheels 131 and 136 of the carriage wheel 72 must be raised before the vehicle reaches the right end of the main section MS so that they may travel over the roadway until the carriage wheels 72 and 73 moves onto the roadway branch section B1 and that, similarly, the guide wheels 131a and 136a of the carriage wheel 73 must be raised before the carriage leaves the roadway main section MS if the vehicle is to move from the roadway main section MS to the branch section B2.

To permit such upward movement of the carriage wheels over the roadway, the top outer portions of the guide beams 14 and 15 are removed to form notches 240 and 241, respectively, at locations spaced from the junctions of the branch sections with the main section of the roadway.

A switch ramp 242 is pivotally mounted below the notch 240 with one end thereof being pivotally secured, as at 243, to the roadway and its other end is pivotally secured, as at 244 to the upper end of an actuator rod 245 which is movable by any suitable operator means 246, hydraulic, electric or the like so that the switch ramp 242 may be moved from its lower inoperative horizontal position illustrated in FIG. 1A in full lines to its inclined operative position illustrated in broken lines. A similar ramp 242a is similarly mounted below the notch 241 of the guide beam 15. The top horizontal flanges 248 and 248a of the switch ramps 242 and 242a are engageable by the bottom ends of the slide bars 126 and 126a of the wheel supports 115 and 115a, respectively, to cause the slide bars 126 and 126a, therefore the guide wheels 131 and 136 and 131a and 136a to be moved upwardly through the notches 240 and 241, respectively, to positions over the top surface of the roadway.

Entrapment rails 250 and 251 which are engageable by the stop 162 are provided to prevent upward movement of the wheel supports 115 and 115a and thus maintain mechanical entrapment of the carriage where the guide beam flanges are removed to form the notches 240 and 241.

It will be apparent that as one slide bar 226 or 226a is moved upwardly by a switch ramp 242 or 242a, the other is moved downwardly due to the provision of the linkages 140 and 140a and the cable 141.

Except when the vehicle is being switched from one roadway section to another, the guide wheels of the carriage are disposed intermediate the top and bottom outer flanges of the guide beams. It will be apparent that when the guide wheels of one carriage support wheel of a pair of laterally aligned carriage wheels is in an upper position above the top surface of the roadway, the guide wheels of the other support wheel of the pair will be in a lower position relative to its associated guide beam, as shown in FIG. 2.

As the carriage moves onto a roadway branch section, the guide wheels which are above the roadway are lowered through the notches 260 or 261 of the flanges of the guide beams 14b and 15a back into operative positions, wherein they can engage their associated guide beam such, as the guide beam 14b or 15a, by a lift ramp 263 or 263a located along the guide beams 14a and 15b and aligned with the notches 260 and 261, respectively. The bottom ends of the slide bars 226 and 226a associated with each guide wheel assembly 125 will, of course, engage these lift ramps 263 of 263a, and will move one guide wheel assembly 125 or 125a upwardly and thus move the opposite guide wheel assembly 125a or 125 downwardly through the notches 263 or 263a.

Suitable control means are, of course, provided for the devices which raise and lower the switch ramps. Such control means not being a part of this invention are not described herein. It will now be seen that the above described and illustrated vehicle will ride very smoothly over the roadway since the relatively hard polyurethane wheels of the drive carriages are supported on the smooth top flanges of the guide beams, instead of on concrete, and since the lost motion connections do not transmit shocks or vibrations from the carriage to the vehicle except at times when the chassis frame is being held against lateral movement relative to the carriage by the restraint rods or the vehicle is moving over a curved portion of the roadway. In the latter cases, the shock absorbers of the lost motion couplings absorb some of the force of the shocks and vibrations. In addition, since the steering levers 181 provide a mechanical advantage of less than one between the steering and coupling rods 190 and 185, the amplitude of vibrations imparted to the front ends of the steering levers is attenuated in transmission to the coupling rods. In addition, since the guide rails 14 and 15 and the primaries 18 of the linear induction motor are rigidly secured relative to one another by the supports, the primaries will not shift relative to the wheels, and therefore to the secondaries, as could be the case if the primaries were embedded in and supported by concrete.

It will also be seen that if the guide wheel assemblies, such as 125 and 125a, of each pair of carriage support wheels are not connected, as by the linkage 140, the roadway must be provided with separate ramps for each assembly to the assembly if it is to move over the roadway and to lower the assembly as it moves onto the roadway section onto which the vehicle is being switched.

It will now be apparent that a new and improved transportation system has been illustrated and described having guide beams providing smooth support surfaces over which the support wheels of the drive carriages of vehicles may roll so as to minimize generation of vibrations, that the drive carriages are steered by guide wheels which cause the carriage support wheels to turn to travel over curved portions of the roadway and which prevent lateral displacement of the carriages relative to the roadway, and that the carriages are connected to the steering mechanisms of the front and rear pairs of vehicle support wheels by connector and restraint means which cause the vehicle wheels to turn in accordance with the turning movements of their drive carriages and which limit lateral displacements of the vehicle relative to the roadway.

What is claimed is:

1. A transportation system including: a roadway providing a pair of laterally spaced vehicle wheel support surfaces over which support wheels of vehicles are movable and guide means disposed between said vehicle wheel support surfaces providing a pair of horizontal parallel spaced carriage wheel support surfaces spaced inwardly of said vehicle wheel support surfaces and a pair of spaced vertical parallel guide surfaces; and a vehicle movable over said roadway and including a chassis frame having a pair of front and a pair of rear vehicle support wheels turnable about vertical axes and movable over said vehicle support surfaces of said roadway; a drive carriage extending between said vehicle wheels and below said chassis frame and having front and rear end sections and a central section between and movably connected to said end sections, said end sections of said carriage having carriage support wheels rotatable about substantially horizontal axes and turnable about vertical axes for supporting said carriage end sections on said support surfaces of said guide means; individual guide means operatively associated with each of said support wheels of said end sections of said carriage and engageable with said vertical guide surfaces of said roadway guide means for causing said carriage to follow said roadway and for preventing lateral movement of said carriage relative to said roadway; steering mechanisms operatively associated with said pairs of vehicle support wheels and said carriage end sections for causing said pairs of vehicle support wheels to turn in accordance with the turning movement of said carriage end sections; and linkage means connecting said middle carriage section to said chassis frame, for causing said chassis frame to move with said carriage over said roadway, said carriage and said roadway having cooperable means for propelling said carriage over said roadway.

2. The transportation system of claim 1, wherein each of said steering mechanisms includes lost motion coupling means between said carriage and said vehicle support wheels for permitting limited lateral displacement of said vehicle from a central position relative to said roadway before said steering mechanism is rendered operative to turn said associated vehicle support wheels to cause the vehicle to move back toward its central position.

3. The transportation system of claim 2, and individual restraint means operatively associated with each said steering mechanism and its associated carriage end section for limiting lateral movement of said chassis frame relative to the associated carriage end section when the lateral displacement of the chassis frame relative to the associated carriage end section exceeds a predetermined value.

4. The transportation system of claim 3, wherein each of said carriage end sections includes a frame, said carriage support wheels of each of said carriage end sections comprising a pair of front and a pair of rear support wheels, wheel support means connecting said wheels to said carriage end section frame, said carriage support wheels being turnable about horizontal axes; and linkage means connecting each pair of laterally aligned carriage support wheels for causing simultaneous movement of each pair of laterally aligned carriage support wheels.

5. The transportation system of claim 4, wherein each of said steering mechanisms includes a steering lever pivotally connected intermediate its ends to said vehicle and extending substantially longitudinally of said vehicle chassis frame, said steering lever having its front end connected to the front end of the carriage frame of its associated end carriage section by a first connecting means and its rear end connected to the rear end of the carriage frame by said restraint means, said first connection means causing pivotal movement of said steering lever upon lateral movement of the front end of the carriage frame relative to said roadway to cause turning of its associated pair of vehicle support wheels to steer the vehicle toward a central position on said roadway, said restraint means being operable to limit pivotal movement of said steering lever to prevent lateral movement of said vehicle chassis frame relative to said carriage and said roadway when the lateral displacement of the vehicle relative to the carriage exceeds said predetermined value.

6. The transportation system of claim 1, wherein each of said carriage end sections includes a frame, said carriage support wheels of each of said carrage end sections comprising a pair of front and a pair of rear support wheels, wheel support means connecting said wheels to said carriage end section frame, said carriage support wheels being turnable about horizontal axes; linkage means connecting each pair of laterally aligned carriage support wheels for causing simultaneous movement of each pair of laterally aligned carriage support wheels.

7. The transportation system of claim 6, wherein said guide means comprise guide wheels and wherein each of said wheel support means comprises a wheel support connected to a carriage end section frame for pivotal movement about a vertical axes, said guide means geing vertically movably mounted on said wheel support whereby said guide means may be moved to positions above said roadway.

8. The transportation system of claim 7, wherein said guide means comprise guide wheels rotatable about vertical axes.

9. The transportation system of claim 8, wherein said guide means and said roadway have cooperative means for selectively raising said guide means above said roadway.

10. A vehicle adapted to travel over a roadway having a pair of vertical parallel guide surfaces and horizontal wheel support surfaces, said vehicle including: a chassis frame having a pair of front wheels and a pair of rear wheels rollable over said support surfaces of said roadway; a drive carriage disposed longitudinally of said chassis frame between said wheels and connected to said chassis frame, said carriage including a pair of end sections and a middle section extending between and connected to said end sections by connector means permitting pivotal movement about longitudinally spaced vertical axes of said end sections relative to the middle section, each of said carriage end sections including a frame, a pair of front support wheels and a pair of rear support wheels connected to said carriage frame and movable over said roadway support surfaces, and individual guide means operatively associated with each of said carriage support wheels and engageable with an associated vertical guide surface of the roadway for causing turning movement of its associated carriage support wheel in accordance with the movement of said guide wheel means and for preventing lateral displacement of said carriage relative to said roadway; and individual steering mechanisms for said front and rear pairs of vehicle support wheels operatively associated with and connected to the frame of adjacent carriage end sections for causing said vehicle support wheels to turn in accordance with the turning of the associated carriage end sections.

11. The vehicle of claim 11, wherein said vehicle chassis frame may move laterally relative said carriage end sections to a limited degree.

12. The vehicle of claim 11, wherein each of said steering mechanisms includes a steering lever connected intermediate its ends to said vehicle and extending longitudinally thereof; and steering and restraint connector means connecting the front and rear ends of each of the carriage frames, respectively, to its associated steering lever, said steering and restraint connector means each comprising a lost motion coupling, said lost motion coupling of said steering connector means permitting a smaller degree of lateral displacement of the front end of the steering lever relative to the front end of a carriage end section frame than the degree of lateral displacement of the rear end of the steering lever relative to the rear end of the carriage end section frame permitted by the lost motion connection of the restraint connector means.

13. The vehicle of claim 12, wherein each of said lost motion couplings includes a slide housing connected to an end of a carriage end section frame and a slide rod slidable in said slide housing and connected to an end of its associated steering lever, said housing and said slide rod having engageable means limiting relative sliding movement between said slide rod and said housing.

14. The vehicle of claim 13, wherein each of said couplings includes shock absorber means between said slide rod and said slide housing for dampening transmission of shock and vibration forces for the carriage to said steering lever.

15. The vehicle of claim 14, and detent means operationally associated between the steering lever of each of said steering mechanism and the chassis frame for releasably holding the vehicle support means in position for travel in a straight line.

16. A vehicle adapted to travel over a roadway having a pair of vertical, parallel guide surfaces, said vehicle including:
   a chassis frame having a pair of front wheels and a pair of rear wheels rollable over said roadway;
   a drive carriage disposed longitudinally of said chassis frame between said wheels and connected to said chassis frame, said carriage having guide means, engageable with the vertical guide surfaces of the guideway, for preventing lateral displacement of said carriage relative to said roadway;
   a steering mechanism for at least one of the pairs of vehicle support wheels operatively associated with and connected to the drive carriage and comprising means for causing said vehicle support wheels to turn in accordance with turning of the associated carriage; wherein said chassis frame may move laterally relative to said carrige to a limited degree.

17. The apparatus of claim 16, wherein the steering mechanism includes a steering lever connected intermediate its ends to said vehicle and extending longitudinally thereof; and steering and restraint connector means connecting the front and rear ends of the carriage to the steering lever, said steering and restraint connector means comprising a lost motion coupling, said lost motion coupling of said steering connector means permitting a smaller degree of lateral displacement of the front end of the steering lever relative to the front end of the carriage than the degree of lateral displacement of the rear end of the steering lever relative to the rear end of the carriage permitted by the lost motion connection of the restraint connector means.

* * * * *